Feb. 25, 1969   H. J. DONELSON, JR   3,429,419
VARIABLE SPEED MATERIAL SPREADER
Filed June 21, 1965   Sheet 1 of 2
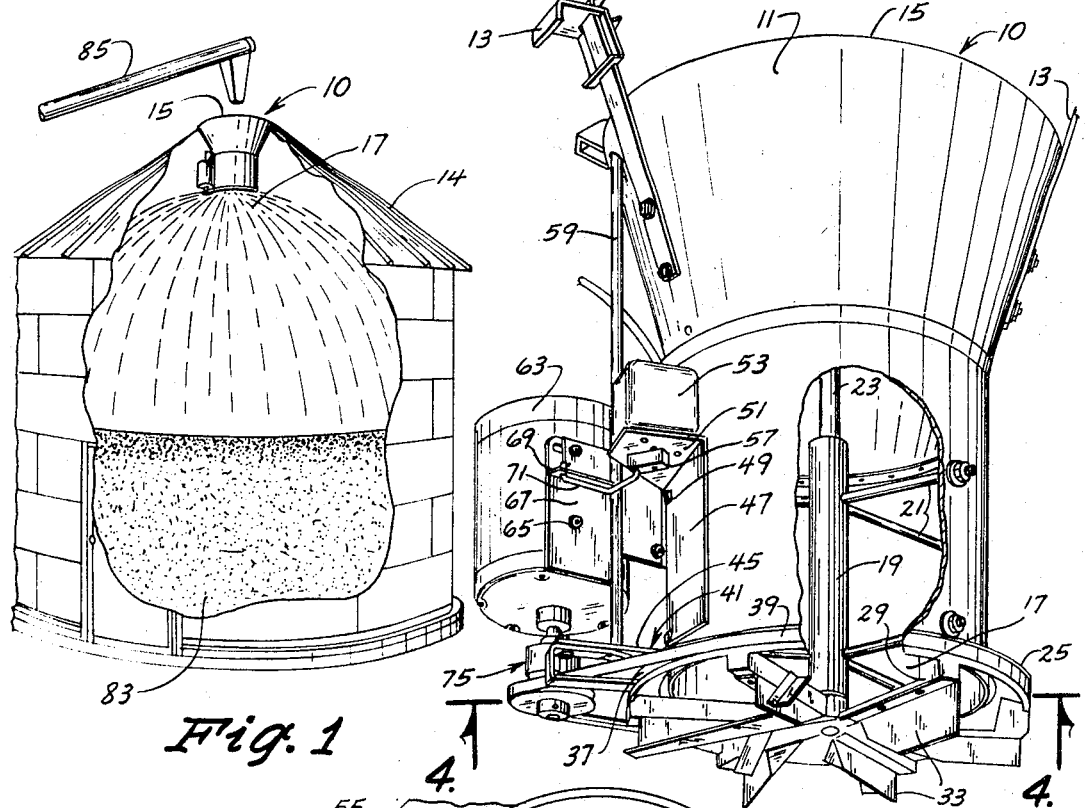
Fig. 1
Fig. 2
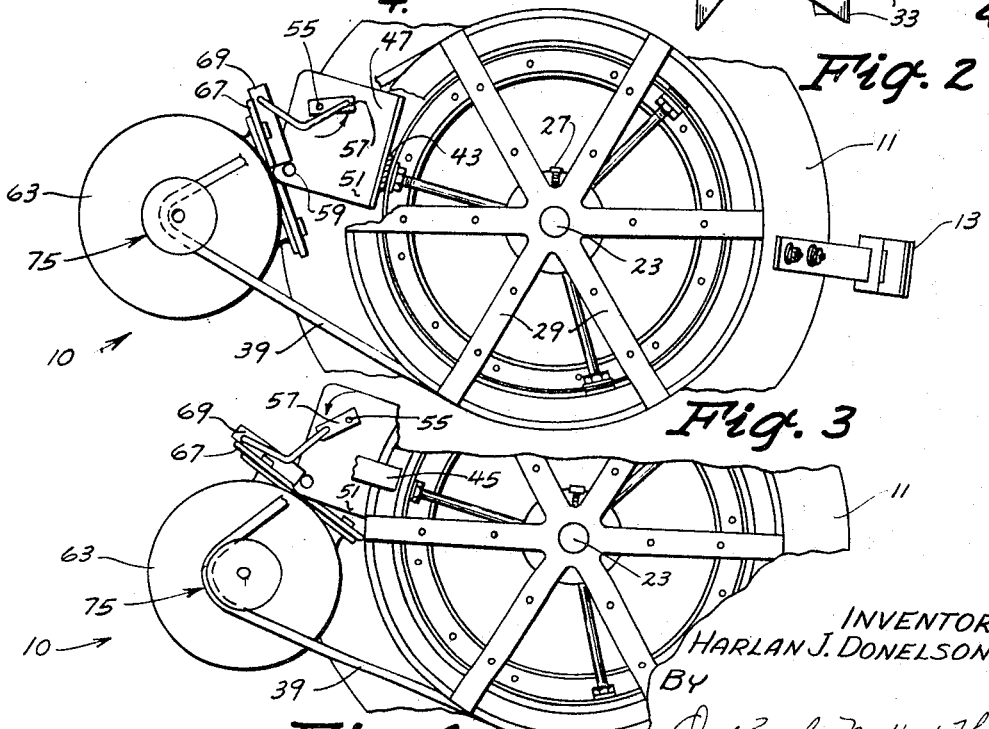
Fig. 3
Fig. 4
INVENTOR
HARLAN J. DONELSON JR.
BY
Dick, Zarley, McKee & Thomte
ATTORNEYS

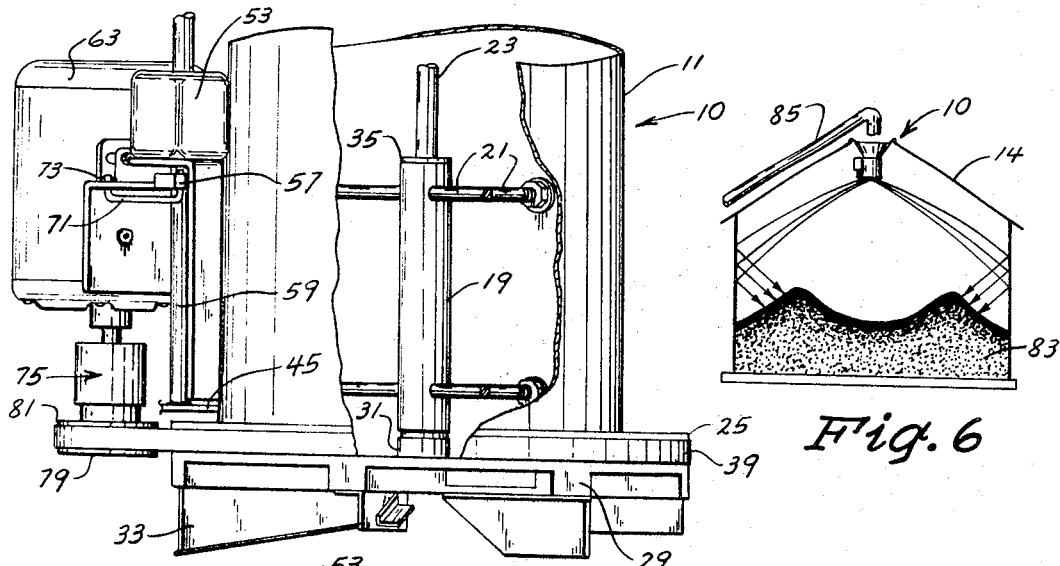
Fig. 5
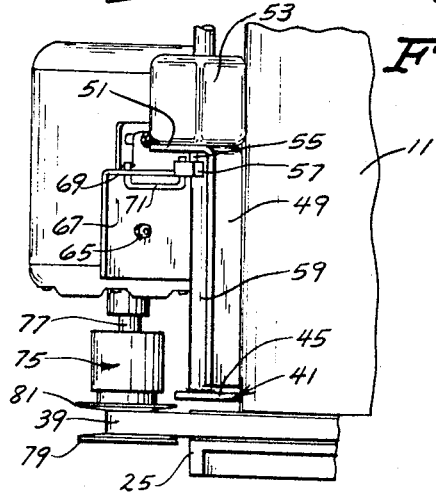
Fig. 7
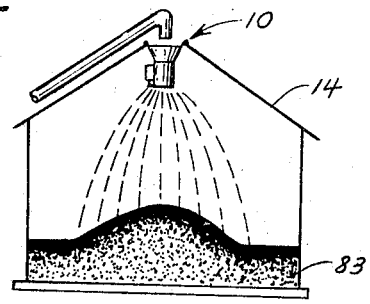
Fig. 6
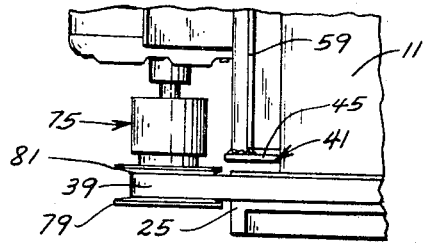
Fig. 9
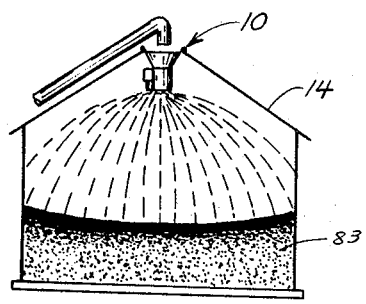
Fig. 8
Fig. 10
INVENTOR
HARLAN J. DONELSON JR.
BY
ATTORNEYS United States Patent Office 3,429,419
Patented Feb. 25, 1969

3,429,419
VARIABLE SPEED MATERIAL SPREADER
Harlan J. Donelson, Jr., W. Highway 330,
Marshalltown, Iowa 50158
Filed June 21, 1965, Ser. No. 465,645
U.S. Cl. 198—128                                3 Claims
Int. Cl. B65g 31/04, 65/32, 23/44

This invention relates to a material spreader and more particularly to a variable speed material spreader which is capable of evenly and uniformly depositing material such as kernels of corn, silage, beans and the like in closed storage space areas such as granaries, silos and the like.

It is one of the objects of this invention to provide a variable speed material spreader which may be mounted in the top inlet end of a granary or the like for distributing the grain uniformly throughout the storage area in the granary.

A further object of this invention is to provide a variable speed material spreader wherein the pattern of grain distribution may be varied.

A further object of this invention is to provide a variable speed material spreader which may be remotely controlled from outside of the granary.

A further object of this invention is to provide a variable speed material spreader having a variable speed pulley secured thereto and which is pivoted away from or towards a scattering wheel to vary the speed thereof.

A further object of this invention is to provide a material spreader having an electric power means which operatively controls the rate of rotation of the scattering wheel.

A further object of this invention is to provide a variable speed material spreader which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a side view of the material spreader positioned in the upper end of a storage bin with portions thereof cutaway to more fully illustrate the invention;

FIG. 2 is a perspective view of the material spreader with portions thereof cutaway to more fully illustrate the invention;

FIG. 3 is a bottom elevational view as would be seen on line 4—4 with portions thereof cutaway to more fully illustrate the invention which illustrates one position of the power means with respect to the spreading wheel, which has the vane members removed therefrom for purposes of illustration;

FIG. 4 is a bottom elevational view as would be seen on line 4—4 of FIG. 2 with portions thereof cutaway to more fully illustrate the invention and which illustrates a second position of the power means with respect to the spreading wheel;

FIG. 5 is a fragmentary side view of the device illustrating the position of the power means which would cause the spreading wheel to be rotated at a high speed;

FIG. 6 is a schematic view illustrating an incorrect distribution of the grain which would result when the spreading wheel was being rotated at a too high rate of speed;

FIG. 7 is a fragmentary side view of the device illustrating the relationship of the power means to the spreading wheel when the spreading wheel is being rotated at a slow rate of speed;

FIG. 8 is a schematic view of the distribution pattern of the grain within the storage bin which would result when the spreading wheel is being rotated at a too slow rate of speed;

FIG. 9 is a fragmentary side view illustrating an intermediate position of the power means with respect to the spreading wheel; and FIG. 10 is a schematic view of the grain distribution pattern within a storage bin when the rate of rotation of the spreading wheel is correct.

The material spreader of this invention is referred to generally by the reference numeral 10 and includes a funnel-shaped housing 11 having support arms 13 provided along its upper peripheral edge for detachable mounting in the inlet end of a granary 14 or the like. The funnel-shaped housing 11 is arranged at its normal position with its enlarged inlet end 15 extending upwardly and its reduced diameter outlet end 17 extending downwardly.

An elongated hollow pipe 19 is positioned within housing 11 by means of braces 21 and rotatably embraces a shaft 23 extending therethrough. A spreading wheel 25 is secured to the lower end of shaft 23 by means of set screw 27 and has a plurality of spokes 29 extending radially outwardly from a central hub portion 31. It should be noted that the diameter of spreading wheel 25 is greater than the diameter of housing 11 at its discharge end. As best seen in FIGS. 2 and 5, a vane 33 is secured to each of spokes 29 by any convenient means for directing the grain therefrom as it strikes the spreading wheel 23. A washer 35 is secured to shaft 23 at a point immediately above pipe 19 by any convenient means such as by welding or the like to prevent downward movement of shaft 23 with respect to pipe 19. Spreading wheel 25 is provided with a V-shaped groove 37 formed in its periphery which receives an endless belt 39 extending therearound.

A bracket 41 is secured at its base portion 43 by a bolt or the like and has a lower portion 45 extending horizontally outwardly therefrom and has an upper portion (not shown) extending horizontally outwardly therefrom. A speed control motor bracket 47 is secured to bracket 41 by bolts 49 and has shelf portion 51 extending horizontally outwardly from the upper end thereof as best seen in FIG. 2. An electric speed control motor 53 is secured to the upper surface of shelf portion 51 by any convenient means and has its power shaft 55 extending downwardly through an opening in shelf portion 51 and has an arm member 57 secured by one of its ends thereto.

A rod 59 having its lower end rotatably mounted in lower portion 45 of bracket 41 extends upwardly therefrom through an opening in the upper portion of bracket 41 and has its upper end rotatably received by housing 11 as seen in FIG. 2. A mounting plate 61 is welded to rod 59 which serves to support motor 63 as best seen in FIG. 2. Secured to mounting plate 61 by bolt 65 is a link bracket 67 having a shelf portion 69 extending horizontally outwardly from the upper end thereof which has an opening adjacent one end thereof which rotatably receives one end of an arcuate link 71 extending therethrough. A cotter key 73 or the like maintains link 71 in the opening in shelf portion 69. The other end of link 71 is rotatably received by arm member 57 as best seen in FIG. 2. It can be seen that arm member 57 is connected at one of its ends to the power shaft of speed control motor 53 and is rotatably secured to link 71 at its other end. Link 71 is maintained in arm member 57 by a cotter key or the like.

A conventional spring-type variable speed pulley means 75 is secured to the lower end of power shaft 77 and consists of a fixed lower pulley sheave portion 79 and a movable upper pulley sheave portion 81. A spring means within pulley means 75 urges sheave portion 81 towards sheave portion 79 and yieldably resists the upward movement of sheave portion 81 with respect to sheave portion 79. Sheave portions 79 and 81 would normally assume the position as seen in FIG. 5.

Motors 53 and 63 are connected to a suitable power supply and are controlled by means of a switch located on the exterior surface of the storage bin at a point near the ground.

In operation, grain 83 is supplied to the upper end of the material spreader 10 by means of an auger 85 or the like. Motor 63 causes spreader wheel 25 to rotate and to deflect the downwardly passing grain outwardly and downwardly therefrom as seen in FIGS. 1, 6, 8 and 10. Any combination of vanes 33 may be used to spread the grain. It is important that the upper level of the grain in storage bin 14 be maintained in the configuration as seen in FIG. 10. If the grain is not being deposited in a substantial level manner and the grain is hitting high and hard on the storage bin side, it is simply necessary to reduce the rate of rotation of spreading wheel 25. This is achieved by activating speed control motor 53. The activation of speed control motor 53 causes arm member 57 to be rotated due to its connection to the power shaft of speed control motor 53. It can be appreciated that the cam action of arm members 57 will cause motor 63 to be pivotally moved towards or away from spreading wheel 25 due to the inner connection of motor 63 with arm member 57 by means of link 71. The pivotal movement of motor 63 towards spreading wheel 25 will decrease the inward pressure of belt 39 between sheave portions 79 and 81 so that the spring means in the variable speed pulley 75 will cause upper sheave portion 81 to move towards lower sheave portion 79 thereby causing belt 39 to be squeezed towards the outer periphery of the sheave portion as best seen in FIGS. 4 and 5. When belt 39 occupies the positions seen in FIGS. 4 and 5, the spreading wheel will obviously be caused to rotate at a higher speed than when the belt occupies the position with respect to variable speed pulley 75 as seen in FIG. 7. When it is desired to decrease the rate of rotation of spreading wheel 25, it is simply necessary to activate speed control motor 53 so that motor 63 is pivoted away from spreading wheel 25 thereby causing belt 39 to spread sheave portions 79 and 81 so that it is positioned adjacent the center of the pulley means as seen in FIGS. 3 and 7.

The rate of rotation of spreading wheel 25 may be quickly and easily varied by simply pivoting motor 63 away from or towards spreading wheel 25 as necessary to maintain the proper distribution pattern within the storage bin. The rate of rotation of spreading wheel 25 may be precisely controlled from the position of FIG. 5 to the position of FIG. 7 or any speed therebetween. Thus it can be seen that a very simple and economical means is provided for varying the rate of rotation of a spreading wheel on a material spreader.

Therefore it can be seen that the device accomplishes at least all of its stated objectives.

Some changes may be made in the construction and arrangement of my Variable Speed Material Spreader without departing from the real spirit and purpose of my invention, and it is my intention to cover by my claims, any modified forms of structure or use of mechanical equivalents which may be reasonably included within their scope.

I claim:
1. In a material spreader,
a housing means having an inlet and an outlet opening,
a shaft means positioned in said housing means,
a rotatable spreading wheel means secured to said shaft means at the outlet opening of said housing means,
a power means pivotally secured to said housing means and movable towards and away from said spreading wheel means,
a variable speed pulley means secured to the power shaft of said power means,
a belt extending around and between said variable speed pulley means and said spreading wheel to cause rotation thereof,
said variable speed pulley means being adapted to increase the rate of rotation of said spreading wheel means when said power means is pivotally moved towards said spreading wheel means and adapted to decrease the rate of rotation of said spreading wheel means when said power means is pivotally moved away from said spreading wheel means,
and electric power means pivotally moving said power means with respect to said spreading wheel at times said electric power means including a power shaft,
a linkage means operatively pivotally secured at one of its ends to said power means, said linkage means being operatively eccentrically secured at its other end to said power shaft of said electric power means.

2. In a material spreader,
a housing means having an inlet and an outlet opening,
a shaft means positioned in said housing means,
a rotatable spreading wheel means secured to said shaft means at the outlet opening of said housing means,
a first bracket having a vertical base portion and upper and lower portions extending horizontally outwardly therefrom and being secured at its base portion to said housing means,
a vertical rod extending through said upper and lower portions and rotatably mounted therein,
a mounting plate secured to said vertical rod,
a power means secured to said mounting plate and having a variable speed pulley means secured thereto,
a belt means extending around and between said pulley and said spreading wheel to cause rotation of said spreading wheel when said power means is activated,
an electric speed control power means operatively secured to said bracket and having an elongated arm member secured by one of its ends to the power shaft thereof,
an arcuate link pivotally secured at one of its ends to the other end of said arm member and operatively pivotally secured at its other end to said mounting plate,
said speed control power means pivoting said power means towards said spreading wheel to increase the rate of rotation thereof at times and pivoting said power means away from said spreading wheel to decrease the rate of rotation thereof at other times.

3. In a material spreader,
a housing means having an inlet and an outlet opening,
a shaft means positioned in said housing means,
a spreading assembly secured to said shaft means at the outlet opening of said housing means,
power means operatively connected to said spreading assembly to cause rotation thereof, and
means for varying the rate of rotation of said spreading assembly,
said power means having a variable speed pulley means secured thereto which is adapted to receive an endless belt extending between it and said spreading assembly and which is adapted to vary the rate of rotation of said spreading assembly,
said power means being pivotally secured to said housing and being movable towards said spreading assembly to cause said variable speed pulley means to increase the rate of rotation of said spreading assembly at times and being movable away from said spreading assembly to cause said variable speed pulley means to decrease the rate of rotation of said spreading assembly at times, and an electric speed control power means operatively connected to said power means adapted to pivotally move said power means towards said spreading assembly at times and to pivotally move said power means away from said spreading assembly at other times, said speed control power means having an elongated arm member secured at one of its ends to the power shaft of said speed control power means, said arm member having a link pivotally secured at one of its ends to the other end of said arm member, said link being operatively pivotally connected at its other end to said power means.

References Cited

UNITED STATES PATENTS

| | | | |
|---|---|---|---|
| 2,961,245 | 11/1960 | Romeiser | 198—128 X |
| 2,980,009 | 4/1961 | Donelson | 198—128 X |
| 3,165,003 | 1/1965 | Buss | 74—230.17 |

GERALD M. FORLENZA, *Primary Examiner.*

ROBERT G. SHERIDAN, *Assistant Examiner.*

U.S. Cl. X.R.

198—110; 214—17